United States Patent [19]

Kattner et al.

[11] Patent Number: 4,504,845

[45] Date of Patent: Mar. 12, 1985

[54] PIEZOELECTRIC PRINTING HEAD FOR INK JET PRINTER, AND METHOD

[75] Inventors: Erich Kattner, Neubiberg; Kurt Herzog, Munich, both of Fed. Rep. of Germany

[73] Assignee: Siemens Aktiengesellschaft, Berlin & Munich, Fed. Rep. of Germany

[21] Appl. No.: 523,946

[22] Filed: Aug. 17, 1983

[30] Foreign Application Priority Data

Sep. 16, 1982 [DE] Fed. Rep. of Germany ....... 3234408

[51] Int. Cl.$^{3}$ ............................................ G01D 15/18

[52] U.S. Cl. ................................ 346/140 R; 29/25.35; 29/856

[58] Field of Search .................... 346/140 R; 29/25.35, 29/856

[56] References Cited

U.S. PATENT DOCUMENTS

| | | | |
|---|---|---|---|
| 4,158,847 | 4/1978 | Heinzl et al. | 346/140 R |
| 4,248,823 | 2/1981 | Bader | 264/156 |
| 4,368,477 | 1/1983 | Heinzl | 346/140 |
| 4,414,552 | 11/1983 | Bergmann | 346/140 X |

*Primary Examiner*—Joseph W. Hartary

*Attorney, Agent, or Firm*—Hill, Van Santen, Steadman & Simpson

[57] ABSTRACT

A printing head for an ink jet printer has a plurality of ink channels formed as hollow tubes, each with a hollow cylindrical piezoelectric transducer, which tubes are interconnected to form a piezoelectric tube group. The piezoelectric tube group is assembled with a front housing part which supports the front end of the tube group, and a housing cap bearing electrical contacts engaging the piezoelectric tube elements is assembled in place, after which the interior is filled with a casting resin.

14 Claims, 3 Drawing Figures

PIEZOELECTRIC PRINTING HEAD FOR INK JET PRINTER, AND METHOD

BACKGROUND

1. Field of the Invention

The present invention relates to a printer head for an ink jet printer, and more particularly to such a head incorporating piezoelectric drive elements.

2. Prior Art

Printing heads for ink jet printers typically contain several means for forming jets, constituting ink channels which run through the printing head. Such an arrangement is shown in the German Pat. No. 2,543,451. The individual ink channels converge in a ray-shapped fashion in the direction of a jet plate, having apertures aligned with the channels and which terminates the ink channels. Piezoelectric drive elements surround the ink channels in a cylindrical fashion toward the rear of the printing head. When the piezoelectric drive elements are energized, the printing fluid is ejected, drop-by-drop, through deformation of the piezoelectric drive elements. This construction permits the manufacture of the print head by means of casting the drive elements in place, while simultaneously forming the ink channels. However, a considerable expense is involved in producing the printing heads in this manner, since the casting must take place in a vacuum in order to satisfy the critical requirements of the internal surface of the ink channels. Furthermore, extreme precision is required in certain parameters such as the mixing ratio and the temperature of the casting compound, in order to form a printing head which is satisfactory. Even with these precautions, however, the interior surface of the ink channels are sometimes rough, and this can lead to interference in operation since the mechanical coupling between piezoelectric element and the ink channel is impaired by roughness, and bubbles of entrained air can collect in the smallest cavities of the ink channel. Also, the providing of electrical connections to the piezoelectric elements also present a problem during manufacturing, since these connections must be made prior to casting of the printing head.

BRIEF DESCRIPTION OF THE INVENTION

A principal object of the present invention is to provide a printing head for an ink jet printer which makes possible a considerably simpler manufacturing process, while at the same time a good interior surface for the ink channels is insured, and an improved contact is provided for the piezoelectric elements.

These objects are attained in the present invention by a construction which allows the independent fabrication of the functional parts of the printing head which are critical. Such parts can be checked prior to final assembly, for their mechanical as well as their electrical properties. In addition, the present invention provides improvements in the electrical connections supplied to the piezoelectrical drive elements so that these connections are materially simplified, especially the connections to the interior electrode to the cylindrical piezoelectric transducers. The present invention also makes these connection more reliable, and eliminates the previous requirement of a wire coil between the ink channel and its transducer. The individual parts of the print head of the present invention can be readily manufactured by the so-called injection molding process, using thermoplastic material, which requires a relatively low molding temperature, and only short molding times.

These and other objects and advantages of the present invention will become manifest by an inspection of the following description and the accompanying drawings.

BRIEF DESCRIPTION OF THE DRAWINGS

Reference will now be made to the drawings in which.

DESCRIPTION OF THE PREFERRED EMBODIMENT

Figure 1:
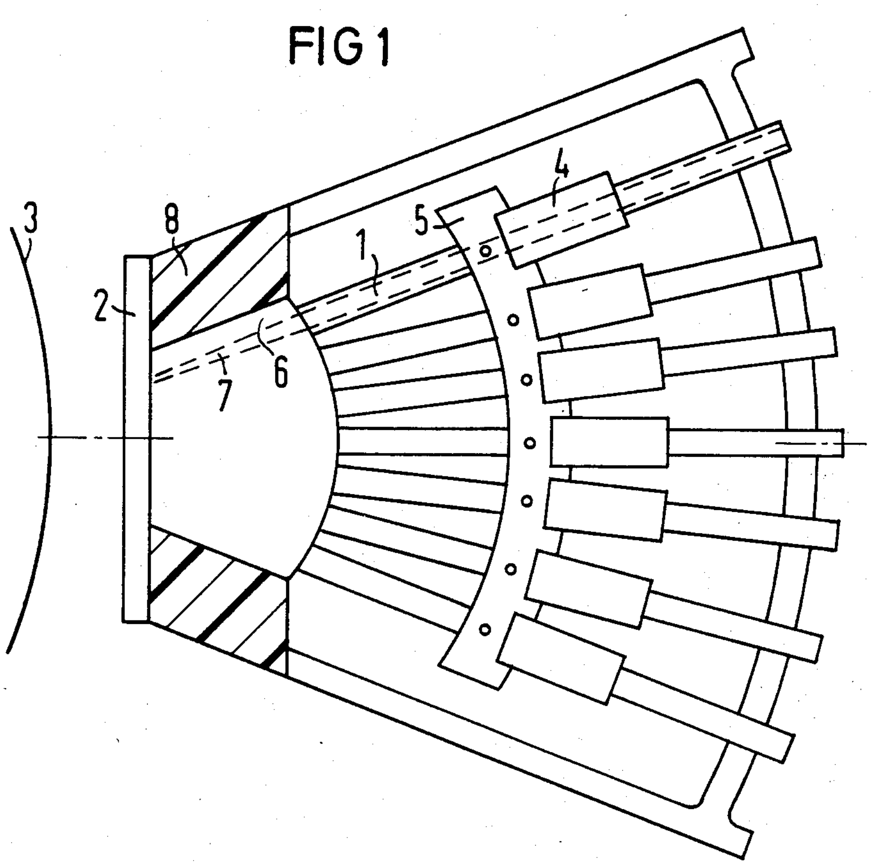
FIG. 1 is a view of a printing head, with its housing cap removed, illustrating the arrangement of various components within the printing head, in accordance with an illustrative embodiment of the present invention.

Refering to FIG. 1, a printing head for an ink jet printer is shown, with the housing cap removed. Seven ink channels 1 are arranged in the printing head, which converge in a ray fashion, and terminate at a jet plate 2. The jet plate 2 is adapted to be disposed in spaced relation to a recording medium carrier 3, so that ink droplets ejected from the ink channels can reach the recording medium. Each ink channel 1 is surrounded by a tubular piezoelectric transducer 4. The right-hand end of each of the channels leads to a ink supply resevoir (not shown).

In the apparatus of FIG. 1, the seven ink channels are arranged in a single plane, so that the seven apertures or exit openings in the jet plate 2 are arranged in a line, in the same plane.

In accordance with the present invention, the seven ink channels 1, together with their transducers 4, are interconnected to form a piezoelectric tube group. The tube group is manufactured as a single part, preferably by the injection molding process, using thermoplastic material. It has a crosspiece or member 5 near its center and a conical shaped crosspiece or member 6, at its front end, adjacent to the jet plate 2. The front ends of the channels are also conical interiorly. A front housing part 8 first serves as a support for the front crosspiece 6, and also mounts the temperature sensing element and the heating element necessary for maintaining the jet plate 2 at a constant temperature. The piezoelectric tube group is covered by a housing covering (not shown in FIG. 1) which supports the contact elements for establishing electrical connections to the piezoelectric transducers.

Figure 2:
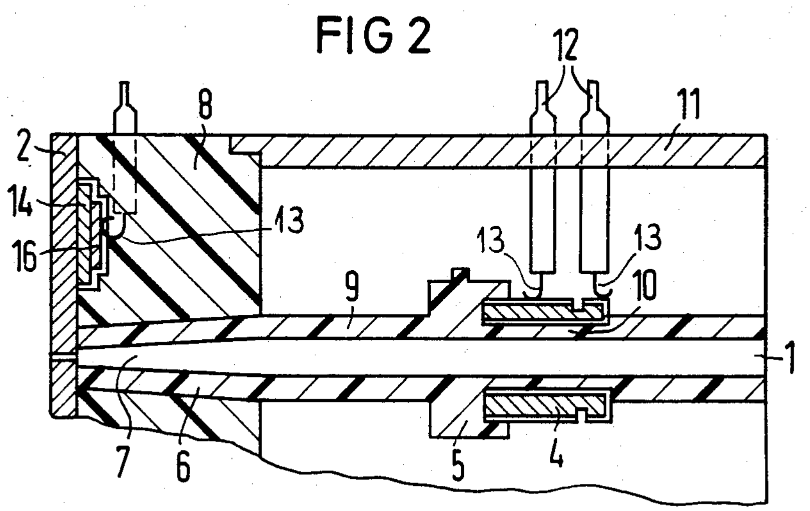
FIG. 2 is a cross-sectional view of a portion of the apparatus in FIG. 1.

FIG. 2 shows a longitudinal section of a printing head incorporating the present invention, in a plane transverse to the plane of FIG. 1. The ink channels 1 are defined by walls 9 formed of thermoplastic casting material, which are compatible with the ink utilized by the ink jet printer, and also complies with requirements for a low flammability characteristic. Each wall 9 forms a protective layer 10 between the piezoelectric transducer 4 of the ink jet channel 1, and the ink therein, which guarantees isolation of the transducer from chemical influences of the ink, and also protects against electrical disturbances, such as short circuits, which might be caused by the ink. Each transducer 4 is covered with a contact layer on its outer surface, and another contact layer on its inner surface, the latter being electrically connected or wrapped around one end of the transducer 4 to join a ring or band on the exterior surface of the transducer. This makes it possible to provide an electrical connection from the exterior, and in FIG. 2, contact terminals 12 are illustrated, each having springs 13 at their lower end which contact the contact layers provided on the transducer 4. The terminals 12 are mounted on a housing cap 11, so that by placing the cap 11 in position relative to the housing, the terminals 12 connect with the contacting surfaces of the transducer. Although only one transducer and one set of contact terminals 12 are illustrated in FIG. 2, it will be appreciated that each transducer 4 has a corresponding set of contact terminals 12 with springs 13, which are mounted on the housing cap 11 in position to engage the conducting surfaces of the transducer when the cap 11 is positioned. The spring elements 13 at the lower ends of the contact terminals 12 provide a reliable contact between the transducers 4 and the signal source (not shown) connected with the terminals 12 during operation.

The front region 6 of each of the ink channels 1 are joined together in a conical shape, which is shaped so as to fit snugly into the conical interior of the front housing part 8. The front housing part 8 has a recess at its front end for accomodating a heat conducting plate 14, in which a temperature sensing element and a heating element 16 are mounted, for example by means of soldering. This plate is inserted into the recess of the front housing part during assembly, and makes contact with electrical contacts which are cast in place in the front housing part 8, formed of plastic material. The front surface of the front housing part 8 forms a flat surface for engaging the jet plate 2.

Alternatively, the heat conducting plate 14 with its elements and electrical contacts may be cast in place in the front housing part 8, after which the forward surface of the front housing part may be machined to obtain an extremely smooth surface for mating with the planar surface of the jet plate 2. The machining exposes the heat conducting plate 14, which then lies directly on the jet plate 2.

Figure 3:
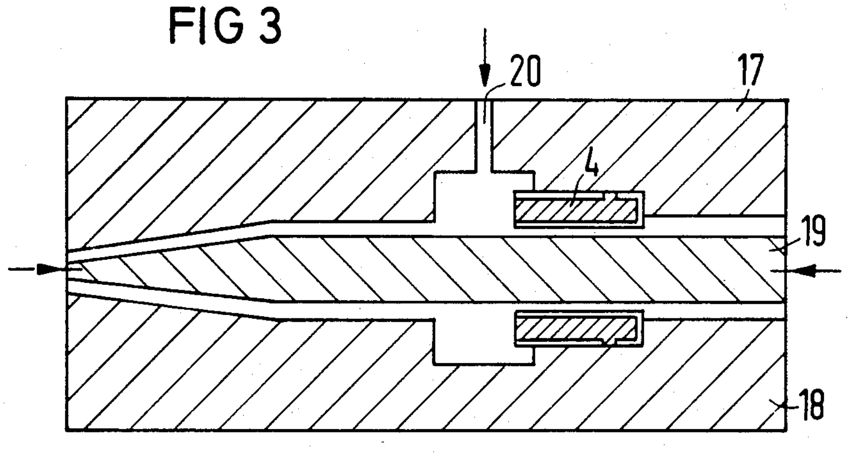
FIG. 3 is a diagramatical illustration of a die for manufacturing the piezoelectric tube group component of the apparatus of FIG. 1.

Each piezoelectric tube group is manufactured in whole as a unit, either by an injection molding process, or by an extrusion process. When an injection molding process is employed, two parts are provided, each of which forms a type of half shell. A cross section of this arrangement is illustrated in FIG. 3. A channel needle 19 is inserted between the two closed form parts 17 and 18. The diameter of the needle 19 corresponds to the interior diameter of an ink channel 1. The wall thickness of the ink channels is determined by the dimensions of the formed parts 17 and 18. The piezoelectric transducers 4 are supported in annular recesses in the formed parts 17 and 18 to surround the needle 19 in concentric fashion. Plastic material is inserted through the filling opening 20, which is preferably arranged in approximately the center of the ink channel, so that approximately equally long flow paths result toward both ends of the ink channel, that is the right and left side as shown in FIG. 3. Preferably, each of the channels 1 has its own filling opening 20. The air in the gap between the needle 19 and the walls of the formed parts 17 and 18 is expelled toward the exterior on both ends. In order to reliably avoid a bending of the channel needle 19 during the injection operation, it can be advantageous to inject the plastic material into the ink channels radially from two opposite sides. The exterior surface of the transducers remain free of the plastic material.

After casting, the needle 19 is withdrawn, so that the ink channel is formed as part of the piezoelectric tube group as a single component. Although only one needle 19 is illustrated in FIG. 3, it will be appreciated that the mold forms 17 and 18 simultaneously mold the tubes for all seven of the ink channels, defined by individual needles 19, together with their interconnecting crosspieces 5 and 6.

The piezoelectric tube group is assembled with the front housing part 8 by inserting the conical front end piece 6 of the tube group into the conical interior of the front housing part 8. The conical shape of the piece 6, and the corresponding shape of the front housing part 8, facilitiates the insertion of the tube group into the front housing part, and guarantees that it is snugly received therein. Subsequently, the housing cover cap 11 is placed in position, with its contact springs 13 pressed against the contact surfaces of the piezoelectric transducers 4, and the interior surrounding the tube group is then filled with a casting resin such as a rapidly hardening plastic. This casting resin surrounds the tubes 9, and transducers 4, to provide reliable protection against humidity, mechanical damage, etc.

It will be appreciated that the printing head of the present invention can be readily assembled of components which are formed so as to provide a smooth and chemically inert surface for the ink channels 1, properly positioning the transducers relative to ink channels 1, and aligning the ink channels with the jet plate 2. Although a print head having a piezoelectric tube group in only one plane has been described, it is apparent that several piezoelectric tube groups may be provided in a single printing head, which then can form a so-called multi-row printing head for an ink jet printer. It is apparent that other modifications and additions may be made by those skilled in the art, without departing from the essential features of novelty of the present invention, which are intended to be defined and secured by the appended claims.

What is claimed is:

1. A printing head for an ink jet printer, including, in combination, a plurality of ink channels, each surrounded by a piezoelectric transducer over a portion of its length, and terminating at a jet plate, said channels being formed by a plurality of hollow tubes disposed in a plane and mechanically interconnected to form a piezoelectric tube group, the wall thickness of said tubes being reduced in the region of the piezoelectric transducers and forming a protective barrier between the interior of the ink channel and the transducer, a front housing part having a conical recess adapted to receive and support said piezoelectric tube group, and a housing cap supporting contact elements adapted to make electrical connection with said piezoelectric transducers when said cap is assembled in place.

2. The printing head according to claim 1, wherein the walls of said tubes are formed of thermoplastic material, and wherein said transducers are partly surrounded and supported by thermoplastic material, with at least a portion of the exterior surface of each said transducer being free of said thermoplastic material.

3. A printing head according to claim 2, wherein said piezoelectric transducer has interior and exterior electrodes, and said housing cap supports electric contact elements for making electrical connection with the interior electrode and the exterior electrode of said piezoelectric transducer, said contact elements having contact springs extending inwardly relatively to said housing cap for making said electrical connections.

4. The printing head according to claim 2, wherein the ends of said tubes are formed with a connecting member having an exterior conical surface, said front housing part having corresponding conical surface for receiving and supporting said connecting member.

5. The printing head according to claim 1, wherein said front housing part comprises thermoplastic material, a heat conducting plate having a temperature sensing element and a heating element, said plate being mounted at the forward surface of said front housing part, adapted to form a contact surface for a jet plate of said printer head.

6. The printing head according to claim 1, wherein said piezoelectric tube group, said front housing part, and said housing cap are all fabricated independently by means of an injection molding process.

7. The printing head according to claim 6, wherein said piezoelectric tube group is formed by use of a two part form, said form having a filling opening for injecting thermoplastic material into the central portion of the tubes of said piezoelectric tube group.

8. The printing head according to claim 7, wherein at least one filling opening is provided for each said channel.

9. A method of constructing a printing head for an ink jet printer, comprising the steps of; forming a plurality of hollow tubes and tubular piezoelectric transducers interconnected by means of a crosspiece as a single piezoelectric tube group component, each tube of said tube group having an individual piezoelectric transducer with exposed electrical contacts for said transducer, assembling said piezoelectric tube group with a front housing part having a recess for receiving and supporting said piezoelectric tube group, and assembling said piezoelectric tube group with a housing cap having electrical contacts supported thereon adapted to engage said contacts of said piezoelectric elements when said cap is in assembled position.

10. The method according to claim 9, including the step of forming the walls of said tubes of thermoplastic material, with at least a portion of the exterior surface of each transducer being free of said thermoplastic material.

11. The method according to claim 10 including the step of providing spring contacts mounted on said housing cap, for engaging the exposed areas of said transducers when said cap is placed in assembled position.

12. The method according to claim 9, including the step of fabricating said tube group, said front housing part and said housing cap all independently.

13. The method according to claim 12, including the step of fabricating said tube group by using a two part form having a filling opening for injecting thermoplastic material into the central portion of the tubes of said tube group.

14. The method according to claim 10, including the step of surrounding the assembled tube group with a casting resin.

* * * * *